United States Patent [19]
Zebryk et al.

[11] Patent Number: 5,828,730
[45] Date of Patent: Oct. 27, 1998

[54] METHOD AND APPARATUS FOR RECORDING AND MANAGING COMMUNICATIONS FOR TRANSCRIPTION

[75] Inventors: Jay Zebryk, Southbridge; Raymond Catuogno, Sr., Belchertown; George Catuogno, Springfield, all of Mass.

[73] Assignee: Sten-Tel, Inc., Springfield, Mass.

[21] Appl. No.: 630,549

[22] Filed: Apr. 10, 1996

Related U.S. Application Data

[63] Continuation-in-part of Ser. No. 374,438, Jan. 19, 1995, abandoned.

[51] Int. Cl.⁶ .............................. H04M 3/56; G06F 13/00
[52] U.S. Cl. ................................. 379/88; 369/25; 369/27; 369/291
[58] Field of Search .................................. 369/25, 26, 27, 369/28, 29; 379/67, 74, 75, 88, 89

[56] References Cited

U.S. PATENT DOCUMENTS

| | | |
|---|---|---|
| D. 244,700 | 6/1977 | Pulos et al. . |
| 2,402,341 | 6/1946 | Patterson .................................. 379/420 |
| 3,156,771 | 11/1964 | Vaughn .................................... 379/420 |
| 3,170,990 | 2/1965 | Beatyy ..................................... 379/420 |
| 3,515,814 | 6/1970 | Morgan .................................... 379/361 |
| 3,609,245 | 9/1971 | Richter ...................................... 379/84 |
| 3,729,201 | 4/1973 | Dollenmayer . |
| 3,895,189 | 7/1975 | Matz . |
| 3,987,960 | 10/1976 | Gardiner .................................... 229/74 |
| 4,104,485 | 8/1978 | Pessel et al. ............................. 379/420 |
| 4,112,305 | 9/1978 | Goto et al. . |
| 4,115,659 | 9/1978 | Spanel et al. ............................ 379/420 |
| 4,125,865 | 11/1978 | Mohammadioun . |
| 4,252,996 | 2/1981 | D'Agostino ............................... 379/99 |
| 4,309,571 | 1/1982 | Chamberlin . |
| 4,321,460 | 3/1982 | Mohammadioun . |
| 4,361,736 | 11/1982 | Long et al. .............................. 381/153 |
| 4,468,751 | 8/1984 | Plunkett, Jr. . |
| 4,621,350 | 11/1986 | Sevitsky et al. .......................... 369/29 |
| 4,677,658 | 6/1987 | Kolodny et al. . |
| 4,720,846 | 1/1988 | Hattori . |
| 4,790,002 | 12/1988 | D'Agosto, III et al. . |
| 4,827,461 | 5/1989 | Sander . |
| 4,851,937 | 7/1989 | Sander . |
| 4,860,339 | 8/1989 | D'Agosto, III et al. . |
| 4,888,807 | 12/1989 | Reichel ..................................... 381/92 |
| 4,891,843 | 1/1990 | Paulus, Jr. et al. ..................... 381/191 |
| 4,893,197 | 1/1990 | Howells et al. . |
| 4,908,866 | 3/1990 | Goldwasser et al. . |
| 4,955,051 | 9/1990 | Sato . |
| 5,008,835 | 4/1991 | Jachmann et al. ........................ 369/29 |
| 5,008,871 | 4/1991 | Howells et al. . |
| 5,136,648 | 8/1992 | Olson et al. .............................. 379/68 |
| 5,179,627 | 1/1993 | Sweet et al. ............................... 395/2 |
| 5,265,075 | 11/1993 | Bergeron et al. . |
| 5,440,624 | 8/1995 | Schoof, II ............................... 379/202 |
| 5,483,588 | 1/1996 | Eaton et al. ............................. 379/202 |
| 5,559,875 | 9/1996 | Bieselin et al. ......................... 379/202 |

OTHER PUBLICATIONS

Octel User Reference Manual, Version 2, Nov. 1994, pp. 29–30.

*Primary Examiner*—Daniel S. Hunter
*Attorney, Agent, or Firm*—Fishman, Dionne, Cantor & Colburn

[57] ABSTRACT

A server located at a first location for recording and managing communications for transcription generated at a second location. Clients contact the server to store communications for transcription. The client is given the option to create a user configurable profile that defines user identification data and recording options for that client. The user identification data includes a user identification number and an audible user identification which is associated with each user identification number. The communications are recorded based on the recording options in the user configurable profile. Exemplary recording options include file integrity and audio archiving. The server also provides the user with the ability to withhold a recording for completion at a later time.

11 Claims, 15 Drawing Sheets

| JOB # | STATUS | USER ID | VOX FILE | VOX SIZE | TYPIST | TEXT FILE | TEXT SIZE | DELIVERED |
|---|---|---|---|---|---|---|---|---|
| 301 | OPEN | 142 | AS.VOX | 5018 | | | 0 | |
| 430 | DELIVERED | 517 | WQ.VOX | 3002 | 5486 | DICT.TXT | 302 | 2/10/95 |
| | | | | | | | | |

METHOD AND APPARATUS FOR RECORDING AND MANAGING COMMUNICATIONS FOR TRANSCRIPTION

This application is a continuation-in-part of Ser. No. 08/374,438 filed Jan. 19, 1995, now abandoned.

BACKGROUND OF THE INVENTION

The present invention relates to a method and apparatus for transcription. More specifically, the present invention relates to a method and apparatus for remote recording, of a conversation between two or more people or a statement by one person (referred to herein as communication), over a telecommunication medium (e.g., telephone lines) for purposes of transcription.

Dictation machines and other devices for recording for the purposes of transcribing the recorded dialog are well known. The following U.S. Pat. Nos. 3,895,189; 4,309,571; 4,790,002; 4,827,461; 4,860,339; and 4,851,937 are discussed briefly below. These examples are not intended to be a complete listing of the prior art but are provided as an example of such.

U.S. Pat. No. 3,895,189 discloses a control circuit for coupling a central record/playback unit of an endless tape loop recording system with an automatic answering coupler of a telephone system, the control circuit including an audio preamplifier for receiving and amplifying audio signals from the answering coupler and means for supplying them to the recording section of the central record/playback unit for recording on the endless loop of tape.

U.S. Pat. No. 4,309,571 discloses apparatus for operating a dictation unit as a telephone-answering device. The dictation unit has a movable record medium upon which an announce message is recorded at a predetermined portion. Switching circuitry is selectively operable to condition the dictation unit to operate as a telephone-answering device, and a line coupler connects the dictation unit to a telephone line.

U.S. Pat. No. 4,790,002 discloses a telephone terminal or a combined telephone-dictation terminal. Such telephone apparatus includes a handset having a microphone and a speaker together with a speaker phone having a microphone and a speaker. Such telephone apparatus also includes a hook switch, which detects on-hook and off-hook conditions of the handset, a speaker phone switch, and a control mechanism, which is responsive to the hook switch and the speaker phone switch. The control mechanism may successively enable and disable at least one of the speaker phone microphone and the speaker phone switch during the on-hook condition.

U.S. Pat. No. 4,827,461 discloses an input coupling apparatus for coupling a telecommunications link, such as a telephone line, to an audio device, such as a recording channel of a telecommunications logger. Input terminals connect the coupling apparatus to the telecommunications link, such as to the tip and ring leads of a telephone line, for receiving audio signals. Voltage, current and remote sensing devices are coupled to the input terminals for detecting an active mode, such as an off-hook condition, during which audio signals are present. When connected to a telephone line, either an off-hook voltage condition or an off-hook current flow is sensed to produce an off-hook signal. When coupled to another communications link, such as a radio link, an external, simulated off-hook signal is detected.

U.S. Pat. No. 4,860,339 discloses a programmable telephone/dictation terminal that can be disposed in any one of several different modes of operation including, but not limited to, dictating information onto a recorder, communicating over a telephone network, recording incoming messages received via a telephone line, preventing a telephone dial out operation and communicating "test" messages with a supervisory console.

U.S. Pat. No. 4,851,937 discloses a multichannel communications recorder or logger. The recorder is formed from modular elements which may be configured into a large number of selectable configurations. In each configuration one or more record decks is controlled by a control module which includes a system control microprocessor and a CRT control microprocessor.

Providing conventional stenographic services is a highly labor intensive and involved process. Most significantly, it requires a highly trained individual to be physically present at the site where a statement will be given or meeting is to occur. Although procedures differ between service providers, the steps typically involve: scheduling of available personnel for the desired date and time of the event; travel to the location of the event; setup and installation of the stenographer and equipment; capture of the vocalization of the event; tear down of equipment; travel back to the service provider's office; transfer of the stenographic record to computer form; translation of the stenographic record to proper English language; printing of transcript; and delivery of transcript to customer.

Time study analysis of this process reveals a disproportionate relationship between overhead (i.e., travel, setup, etc.) and the primary steps which are the capture of the spoken words and the subsequent translation to a finished transcript.

SUMMARY OF THE INVENTION

The above-discussed and other drawbacks and deficiencies of the prior art are overcome or alleviated by the method and apparatus for remote recording of communications for transcription of the present invention. In accordance with the present invention, a telephone at a first location has a handset including a speaker and a microphone as is well known in the art. The telephone is connected over telephone lines to a recording device at a second location remote from the first location.

In accordance with a first embodiment, an acoustic coupler (e.g., a speaker) is disposed at the microphone of the handset. The coupler is connected by a cable to an amplifier device, which is connected by a cable to a microphone, preferably a pressure zone microphone. The microphone is positioned in close proximity to the person or persons for whom a recording (and transcript) of their conversation is desired. The electronics of the amplifier device comprises an audio amplifier circuit, an indicator circuit and a microphone mixer circuit (when more than one microphone is used). The input interface of the audio amplifier circuit is connected to the microphone mixer circuit (or the microphone connection). The output interface of the audio amplifier circuit is connected to the speaker.

During use, the acoustic coupler, the amplifier device and the microphone are connected as described above. A user calls into the remote recording device using the telephone and enters an account/identification code at the telephone. After this code is accepted, recording at the remote recording device can be initiated. Once the communication (i.e. dialog, conversation or statement) has been recorded it can be accessed for transcription, as is well known in the art.

In accordance with an alternate embodiment, an acoustic coupler having a speaker and a microphone, is disposed at the cooperating speaker and microphone of the handset. The acoustic coupler is connected to a communication device, which is connected to a microphone, preferably a pressure zone microphone. The communication device includes a speaker and a keypad. The electronics of the communication device comprises first and second audio amplifier circuits, an encoder circuit, an indicator circuit, and a microphone mixer circuit (when more than one microphone are used). The input interface of the first amplifier circuit is connected to the microphone in the acoustic coupler and the output interface of first amplifier circuit is connected to the speaker in the communication device. The input interface of second amplifier circuit is connected to the microphone for capturing the communication. The output interface of the second amplifier circuit is connected to the speaker in the acoustic coupler. The encoder circuit interfaces with the keypad at the communication device. A switch switches out the microphone and switches in the speaker, both at the communication device, when actuated, in order to avoid feedback, otherwise the microphone is switched in for recording.

During use, the acoustic coupler and the communication device are connected as described above. A user calls into the remote recording device using the telephone, then actuates the switch, and enters an account/identification code on keypad of the communication device. After this code is accepted, recording at the remote recording device can be initiated. Once the communication has been recorded it can be accessed for transcription, as is well known in the art.

In accordance with another alternate embodiment, a communication device is connected directly to the telephone wires (i.e., no acoustic coupler is required). The telephone wires being connected to the remote recording device as described hereinbefore. The communication device includes a speaker, a microphone and a keypad. The electronics for this communication device comprises a standard telephone interface circuit, first and second audio amplifier circuits, an indicator circuit, and a microphone mixer circuit (when more than one microphone is employed). A switch switches out the microphone and switches in the speaker, both at the communication device, when actuated, in order to avoid feedback, otherwise the microphone is switched in for recording.

During use, the communication device is connected as described above. A user calls into the remote recording device using the keypad, then actuates the switch, and enters an account/identification code on the keypad. The user will only hear information communicated from the remote recording device when the switch is held down. After this code is accepted, recording at the remote recording device can be initiated. Once the communication has been recorded it can be accessed for transcription, as is well known in the art.

In accordance another alternate embodiment of the embodiment, the communication device described immediately above includes an antenna, as is known in wireless telephones.

The present invention expands the reach of traditional stenography and transcription services by allowing recordings of conversations and statements (i.e., communications) to be made remotely via a telephone over a telecommunications medium. In accordance with the present invention, the stenographic event is captured at a remote cite and relayed via telephone lines where the event is recorded and transcribed. This allows the skills of the stenographer/transcriptionist to be utilized in a far more efficient manner as well as significantly expanding the geographic area to which a service bureau can provide it's services.

It will be appreciated, that a conventional telephone instrument which transmits the voice of a single person, is wholly inadequate for transmitting a dialog between two or more persons (i.e., a communication). The microphone in the handset of such conventional telephone instruments simply does not have the necessary sensitivity to pick-up sound except when directly spoken into.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
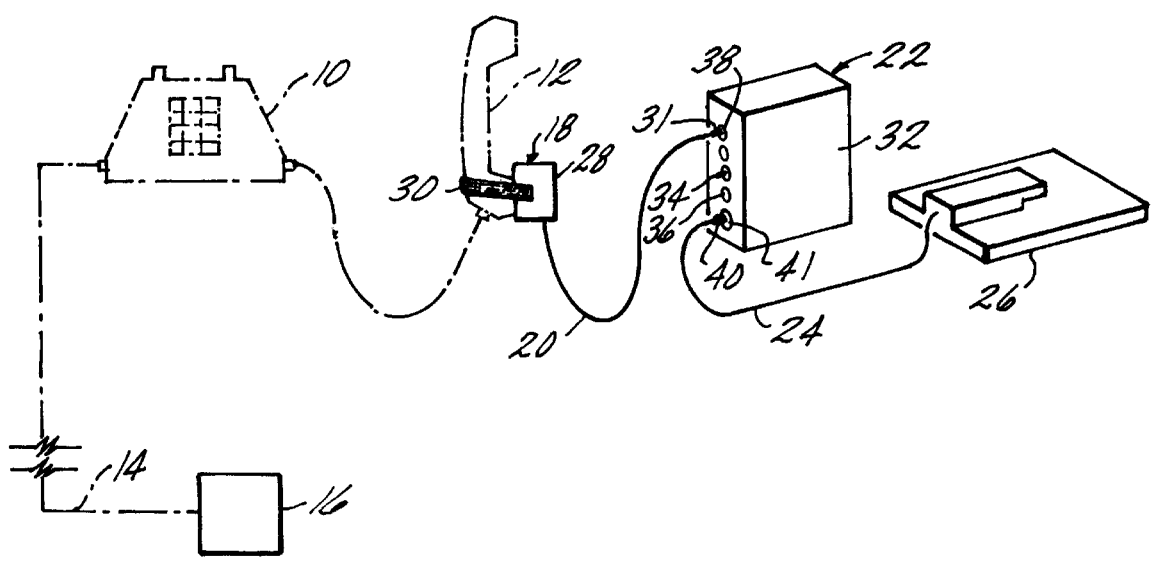
FIG. 1 is a diagrammatic perspective view of the apparatus for remote recording in accordance with a first embodiment of the present invention.

Referring now to FIG. 1, a telephone 10 at a first location has a handset 12 including a speaker and a microphone as is well known in the art. Telephone 10 is connected over telephone lines 14 to a recording device 16 at a second location, remote from the first location.

Recording device 16 comprises any one of a wide variety of devices, including: answering machines; telephone based dictation machines; modems with data/fax/voice mail features for personal computers; dictation/transcription systems (e.g., such are commercially available from Lanier, Dictaphone and Phillips); computer based voice mail systems (e.g., such are commercially available from Rhetorex, Dialogic and NewVoice); and interactive voice response systems, all of which are well known in the art. While operating procedures vary between these units, typically a user dials a phone number at remote equipment and listens for a voice prompt or tone to begin recording. Some of these systems require user identification numbers for access authorization. Further, others allow the recording to be reviewed and edited by the use of telephone touch-tone commands. The completed recording can then be transcribed via local instruments or terminals, or remotely by telephone in either analog or digital format.

In accordance with a first embodiment, an acoustic coupler 18 is disposed at the microphone of handset 12. Coupler 18 is connected by a cable 20 extending therefrom to an amplifier device 22, which is connected by a cable 24 extending therefrom to a microphone 26. Microphone 26 is preferably a pressure zone microphone which is positioned in close proximity to the person or persons for whom a recording (and transcript) of their conversation (i.e., communication) is desired. The pressure zone microphone operates on the boundary zone principal, and is ideal for recording dialog conducted across reflecting surfaces, such as a conference room table. Rather than picking up both direct and reflected sound from such a table, the pressure zone microphone operates in such a manner that the phases of both the direct and reflected sound are coincident and actually combine to produce a stronger and clearer result. Alternatively, a plurality of electret microphones with lapel clips are employed, with each person involved in the conversation being recorded wearing one of the microphones. Further, hand held, wireless or any other suitable type of microphone may be used.

Coupler 18 comprises a speaker 27 (FIG. 2) mounted within an enclosure 28 having openings for speaker 27 and an elastic strap 30 attached thereto. The elastic strap 30 has a length sufficient for extending about the microphone (i.e., mouth piece) portion of handset 12, as is clearly shown in the figure. Alternatively, strap 30 may comprise a strap having a hook and loop (e.g., Velcro®) type attachment. This could be a strap which wraps around the handset and the enclosure 18, and attaches onto itself. There could also be two strap portions which extend around the handset and attach to each other. Cable 20 includes wires connected at one end thereof to speaker 27 and are terminated at on end with a connector 31 (e.g., a mini-phone plug).

Amplifier device 22 includes an enclosure 32 having an indicator 34 (e.g., a light emitting diode, LED) for indicating when the unit is turned on and an indicator 36 (e.g., an LED) for indicating operation of the unit. Enclosure 32 further includes a connector 38 (e.g., a mini-phone jack) for mating with connector 31 of the acoustic coupler 18. Mating of connector 38 also activates (turns on) amplifier device 22. Alternatively, a switch may be providing for turning on the unit. The unit is preferably battery powered, whereby access is provided in enclosure 32 for a battery. Depending upon the battery voltage, a 5 volt dc regulator may be required for power of the amplifier electronics. Alternatively, a transformer for converting 120 volts ac from a wall outlet to a dc voltage may be employed as is well known. It will be appreciated that with the transformer, an additional jack is required in enclosure 32.

Cable 24 of microphone 26 is also terminated at one end thereof with a connector 40, which mates with a connector 41 in enclosure 32 of amplifier device 22. It will be appreciated that additional connectors are provided for each microphone to be attached to amplifier device 22.

Figure 2:
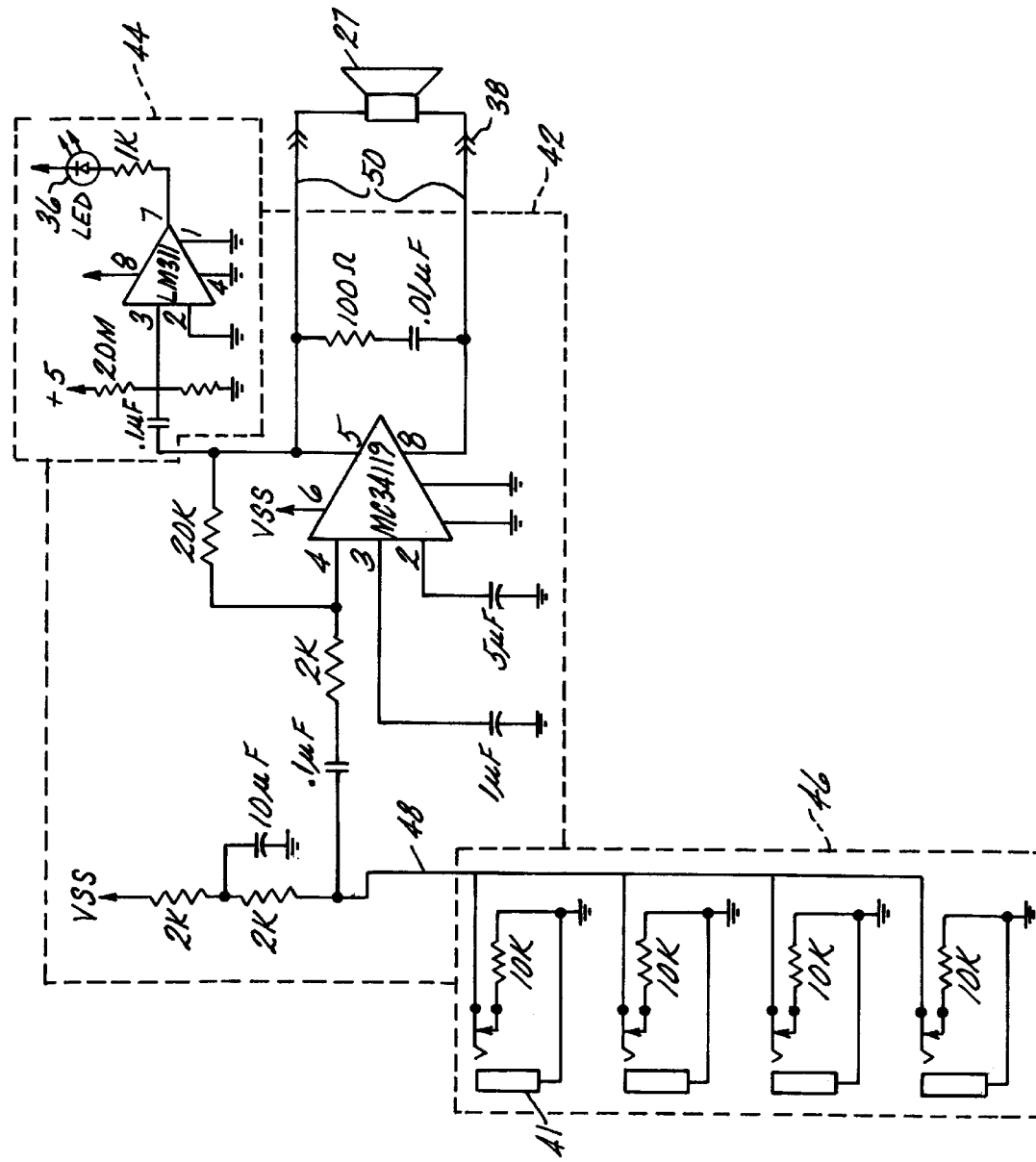
FIG. 2 is a schematic diagram of the electronics of the apparatus for remote recording of FIG. 1.

Referring to FIG. 2, an electrical schematic for the electronics of amplifier device 22 is generally shown. The electronics comprises an audio amplifier circuit 42, an indicator circuit 44 and a microphone mixer circuit 46. Audio amplifier circuit 42 comprises an amplifier, e.g., part no. MC34119 commercially available from Motorola, and associated components for setting the gain and defining the input and output interfaces 48 and 50, respectively. Interface 48 is connected to microphone mixer circuit 46 which comprises a resistor arrangement and is connected to the microphone(s) 26 through connectors 42. Interface 50 is connected to speaker 27 through connector 38. Indicator circuit 44 comprises a driver, e.g., part no. LM311 commercially available from Motorola, connected to LED 36 and illuminates when speaker 27 is driven. It will be appreciated that an automatic gain control (AGC) circuit can be employed to accommodate for a larger range of load to soft sounds, as is well known in the art. Such an AGC circuit amplifies quite or soft sound more and limits loud sound to a fixed maximum level.

During use, coupler 18, amplifier device 22 and microphone 26 are connected as described above. A user calls into recording device 16 using telephone 10 and handset 12, when prompted, over the speaker in the handset 12, the user enters an account/identification code on the keypad of telephone 10. It is assumed that telephone 10 is a touch-tone telephone. Once this code is accepted, the user is instructed to press a particular key to begin recording at remote recording device 16. The user can stop recording by pressing another key on telephone 10, such key being identified by device 16 when the other instructions were given. Once the communication has been recorded it can be accessed for transcription, as is well known in the art.

Figure 3:
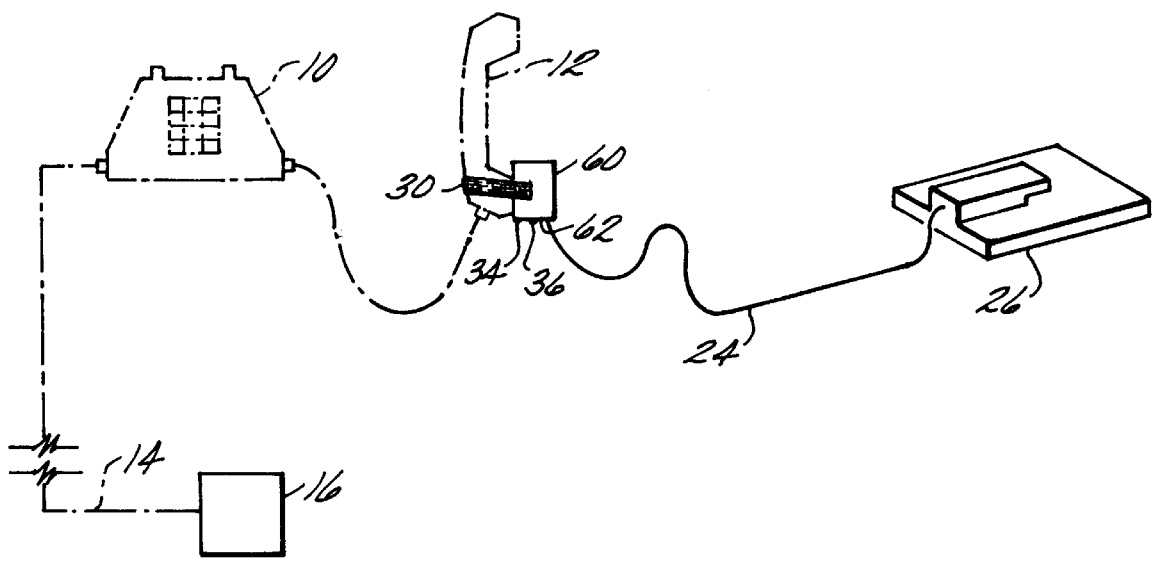
FIG. 3 is a diagrammatic perspective view of the apparatus for remote recording in accordance with a second embodiment of the present invention.

Referring to FIG. 3, in accordance with an alternate embodiment of the embodiment of FIG. 1, the amplifier device and the acoustic coupler are combined into an enclosure 60. Enclosure 60 includes openings for speaker 27 and elastic strap 30 attached thereto. Enclosure 60 further includes indicator 34 for indicating when the unit is turned on and indicator 36 for indicating operation of the unit. A switch 62 is provided to turn the unit on. Microphone 26 is connected through connector 42 in enclosure 60. It will again be appreciated that additional connectors are provided for each microphone. Electronically and operationally, the unit is the same as described above with regard to the embodiment of FIG. 1.

Figure 4:
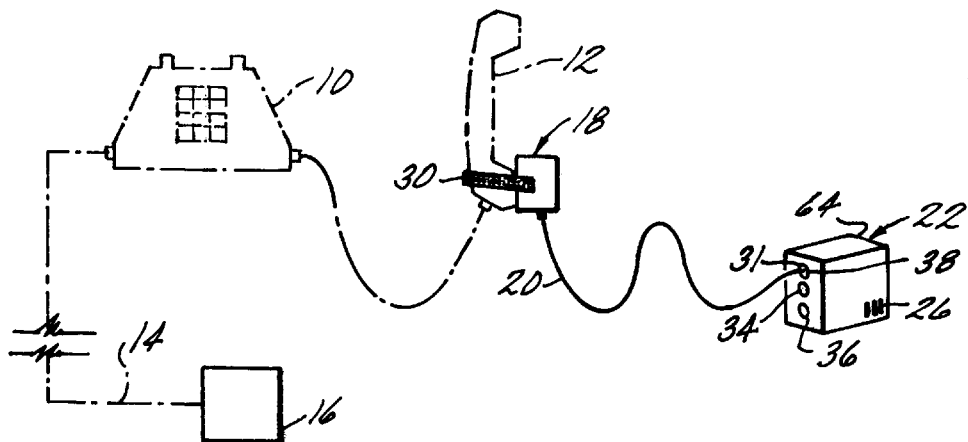
FIG. 4 is a diagrammatic perspective view of the apparatus for remote recording in accordance with a third embodiment of the present invention.

Referring to FIG. 4, in accordance another alternate embodiment of the embodiment of FIG. 1, the amplifier device and the microphone are combined into an enclosure 64. Enclosure 64 includes openings for microphone 26. Enclosure 64 farther includes indicator 34 for indicating when the unit is turned on and indicator 36 for indicating operation of the unit. Enclosure 64 further includes connector 38 for mating with connector 31 of the acoustic coupler 18. Mating of connector 38 also activates (turns on) amplifier device 22, as described above. Alternatively, a switch may be providing for turning on the unit. Electronically and operationally, the unit is the same as described above with regard to the embodiment of FIG. 1.

The above described embodiments are referred to as half duplex systems as the local portion of the overall system (i.e., the acoustic coupler, the amplifier device and the microphone) only provide one-way communication.

Figure 5:
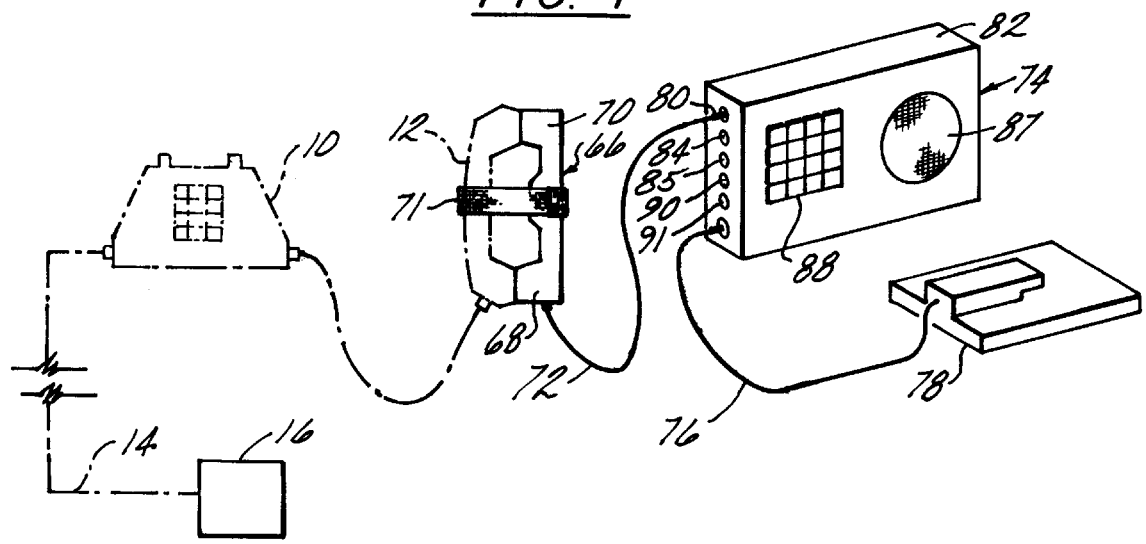
FIG. 5 is a diagrammatic perspective view of the apparatus for remote recording in accordance with a fourth embodiment of the present invention.

Referring to FIG. 5, in accordance with an alternate embodiment, an acoustic coupler 66 having a speaker 68 and a microphone 70, is disposed at the cooperating speaker and microphone of handset 12. Acoustic coupler 66 is, for example, model no. 200, commercially available from Unlimited Systems. Coupler 66 includes a strap 71 having a hook and loop (e.g., Velcro®) type attachment. Strap 71 is attached at one end thereof to coupler 66 and wraps around the handset and the coupler 66, and attaches onto itself. Coupler 66 is connected by a cable 72 extending therefrom to a communication device 74, which is connected by a cable 76 extending therefrom to a microphone 78. Cable 72 is terminated at one end thereof with a connector 80, e.g., a standard telephone plug. Microphone 78 is preferably a pressure zone microphone which is positioned in close proximity to the person or persons for whom a recording or transcript of their conversation is desired. Alternatively, a plurality of electret microphones with lapel clips are employed, with each person involved in the conversation being recorded wearing one of the microphones. Further, hand held, wireless or any other suitable type microphone may be used.

Communication device 74 includes an enclosure 82 having an indicator 84 (e.g., an LED) for indicating when the unit is turned on and an indicator 85 (e.g., an LED) for indicating operation of the unit. Enclosure 82 further includes a connector 86 (e.g., a standard telephone jack) for mating with connector 80 of microphone 78. It will be appreciated that additional connectors are provided for each microphone 78. Enclosure 82 includes openings for a speaker 87 and a 4×4 standard telephone keypad 88 (e.g., a switch matrix, part no. 96BB2-056-F commercially available from Grayhill) is mounted thereon. A switch 90 is provided to turn the unit on. A spring loaded (or biased) switch 91 is provided to switch out microphone 78 and switch in speaker 87. The unit is preferably battery powered to maintain portability, whereby access is provided in enclosure 82 for a battery. Although, a transformer may be employed as described herein before.

Figure 6:
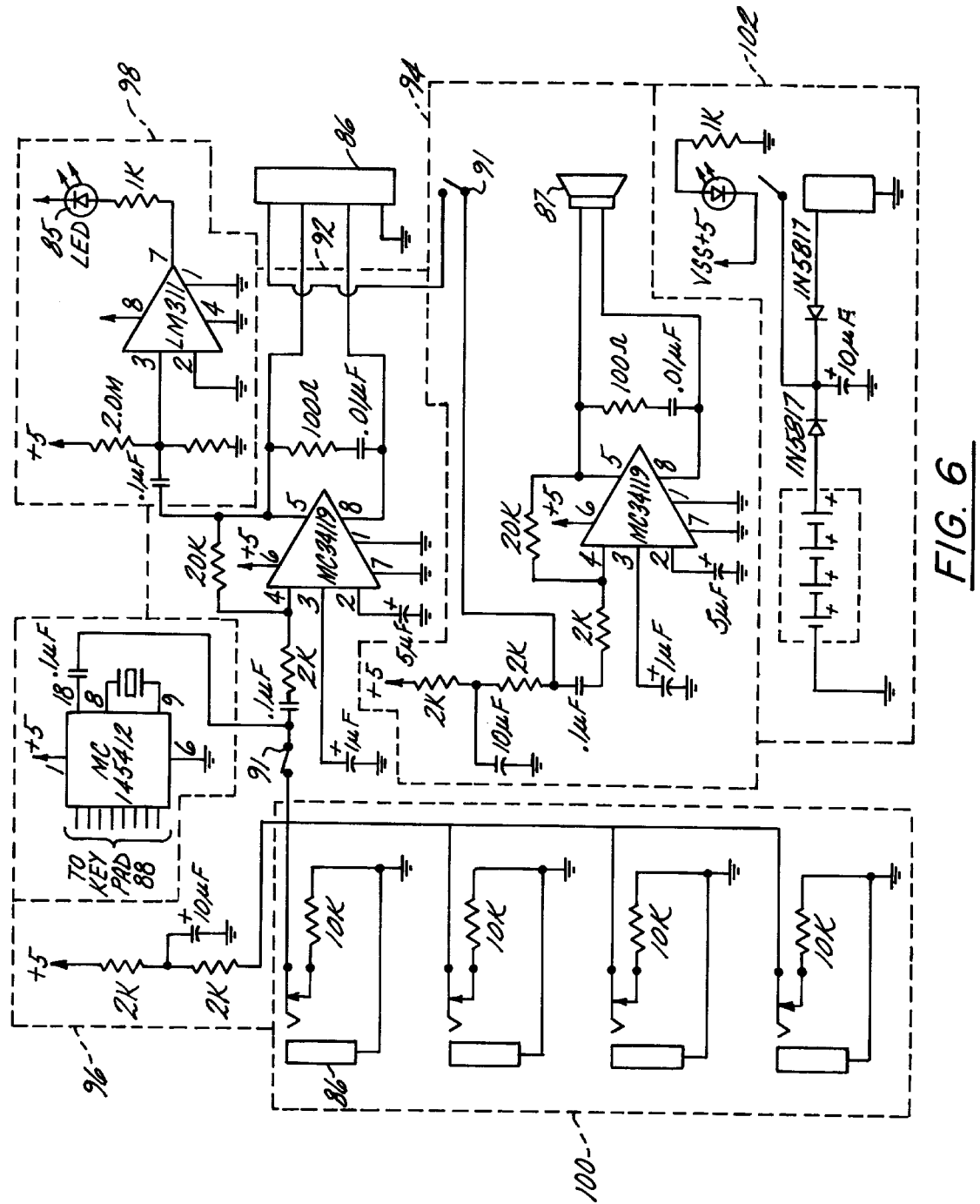
FIG. 6 is a schematic diagram of the electronics of the apparatus for remote recording of FIG. 5.

Referring to FIG. 6, an electrical schematic for the electronics of communication device 74 is generally shown. The electronics comprises a first audio amplifier circuit 92, a second audio amplifier circuit 94, a DTMF encoder circuit 96, an indicator circuit 98, a microphone mixer circuit 100, and a reverse voltage protection circuit 102 (such may also be employed with the other embodiments described herein). Audio amplifier circuits 92 and 94 each comprise, an amplifier, e.g., part no. MC34119 commercially available from Motorola, and associated components for setting the gain and defining input and output interfaces. The input interface of circuit 92 is connected to microphone 70 in coupler 66 and the output interface of circuit 92 is connected to speaker 87. The input interface of circuit 94 is connected to microphone mixer circuit 100 which comprises a resistor arrangement and is connected to the microphones through connectors 86. The output interface of circuit 94 is connected to speaker 68 in coupler 66. Encoder circuit 96 is connected to keypad 88 and comprises a DTMF (telephone touch-tone) encoder (e.g., part no. MC145412 commercially available from Motorola). Indicator circuit 98 comprises a driver, e.g., part no. LM311 commercially available from Motorola, connected to LED 85 and illuminates when speaker 68 in coupler 66 is driven. Switch 91 switches out microphone 78 and switches in speaker 87 when actuated, in order to avoid feedback, otherwise microphone 78 is switched in for recording. It will be appreciated that switch 91 may be replaced by an electronic switch. However, electronic switching results in cutting off portions of the communication being recorded, as such known devices look for communication in both directions and suffer from attack and delay type problems, and such is not acceptable for accurate recording of a communication.

During use, coupler 66 and communication device 74 are connected as described above. A user calls into recording device 16 using telephone 10, then holds down switch 91, when prompted, over speaker 87 in the communication device 74, the user enters an account/identification code on keypad 88 of communication device 74. The user will only hear information communicated from recording device 16 when switch 91 is held down. Once this code is accepted, the user is instructed to press a particular key on keypad 88 to begin recording at remote recording device 16. The user can stop recording by pressing another key on keypad 88, such key being identified by device 16 when the other instructions were given. Once the communication has been recorded it can be accessed for transcription, as is well known in the art.

Figure 7:
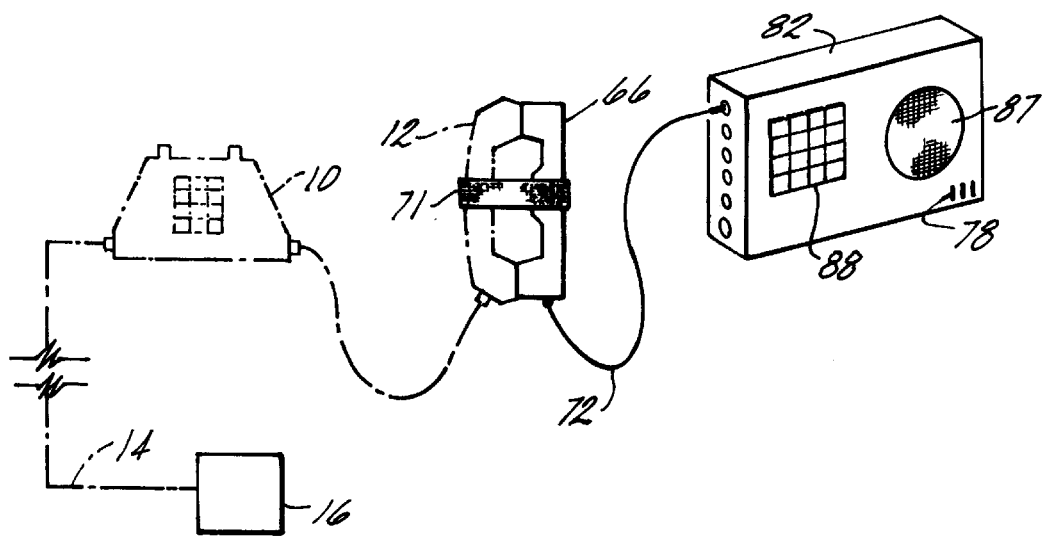
FIG. 7 is a diagrammatic perspective view of the apparatus for remote recording in accordance with a fifth embodiment of the present invention.

Referring to FIG. 7, in accordance with another alternate embodiment of the embodiment of FIG. 5, the communication device and the microphone are combined, whereby a microphone 78 is disposed in enclosure 82. Enclosure 82 includes openings for the microphone 78. Electronically and operationally, the unit is the same as described above with regard to the embodiment of FIG. 5.

Figure 8:
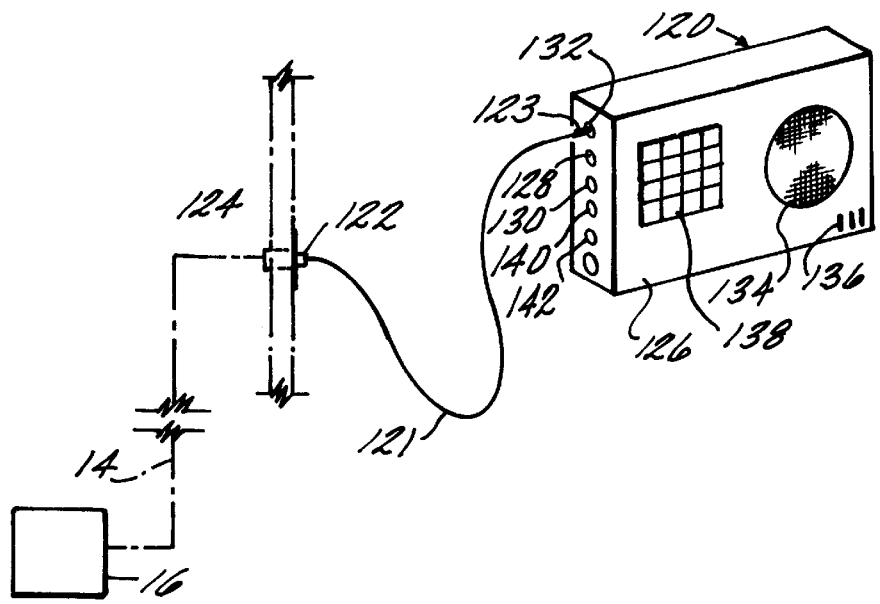
FIG. 8 is a diagrammatic perspective view of the apparatus for remote recording in accordance with a sixth embodiment of the present invention.

Referring to FIG. 8, in accordance with an alternate embodiment, a communication device 120 is connected through a cable 121 having standard telephone plugs 122, 123 and mating telephone jack 124 to telephone wires 14. Telephone wires 14 are connected to recording device 16 as described hereinbefore. Communication device 120 comprises an enclosure 126 having an indicator 128 (e.g., an LED) for indicating when the unit is turned on and an indicator 130 (e.g., an LED) for indicating operation of the unit. Enclosure 126 further includes a connector 132 (e.g., a standard telephone jack) for mating with telephone plug 123 of cable 121. Enclosure 126 includes openings for a speaker 134 and openings for a microphone 136. A 4×4 standard telephone keypad 138 (e.g., a switch matrix, part no. 96BB2-056-F commercially available from Grayhill) is mounted on enclosure 126. A switch 140 is provided to turn the unit on. A spring loaded (or biased) switch 142 is provided to switch out microphone 136 and switch in speaker 134. The unit is preferably battery powered to maintain portability, whereby access is provided in enclosure 126 for a battery. Although, a transformer may be employed, as described herein before. It will also be appreciated that external microphones may be employed in a manner described hereinbefore.

Figure 9:
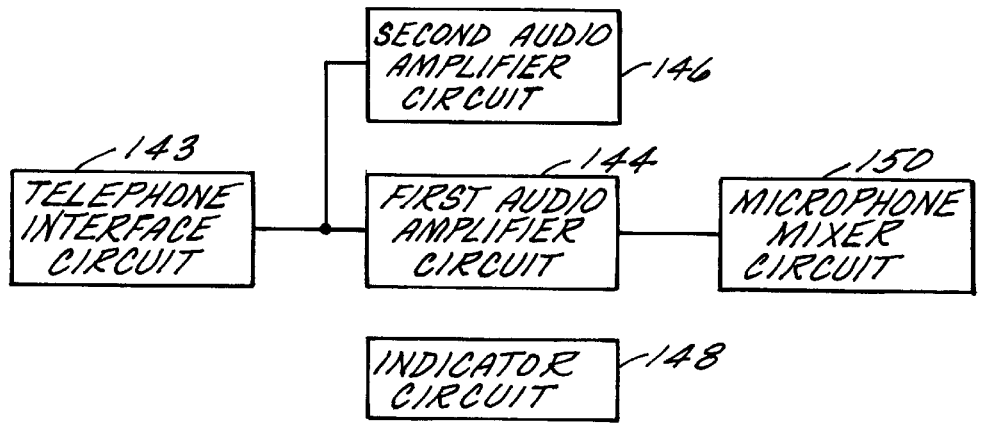
FIG. 9 is a schematic block diagram of the electronics of the apparatus for remote recording of FIG. 8.

Referring to FIG. 9, an electrical block schematic for the electronics of communication device 120 is generally shown. The electronics comprises a standard telephone interface circuit 143 (which includes an encoder circuit for interfacing with keypad 138), a first audio amplifier circuit 144, a second audio amplifier circuit 146, an indicator circuit 148, and a microphone mixer circuit 150 (when more than one microphone is employed). Audio amplifier circuits 144 and 146 are similar to circuits 92 and 94 described with reference to FIG. 6 hereinbefore. Indicator circuit 148 is similar to circuit 98 described with reference to FIG. 6 hereinbefore. Switch 142 switches out microphone 136 and switches in speaker 134 when actuated, in order to avoid feedback, otherwise microphone 136 is switched in for recording, as described in earlier embodiments herein.

During use, communication device 74 is connected as described above. A user calls into recording device 16 using keypad 138, then holds down switch 142, when prompted, over speaker 134, the user enters an account/identification code on keypad 138. The user will only hear information communicated from recording device 16 when switch 142 is held down. Once this code is accepted, the user is instructed to press a particular key on keypad 138 to begin recording at remote recording device 16. The user can stop recording by pressing another key on keypad 138, such key being identified by device 16 when the other instructions were given. Once the communication has been recorded it can be accessed for transcription, as is well known in the art.

Figure 10:
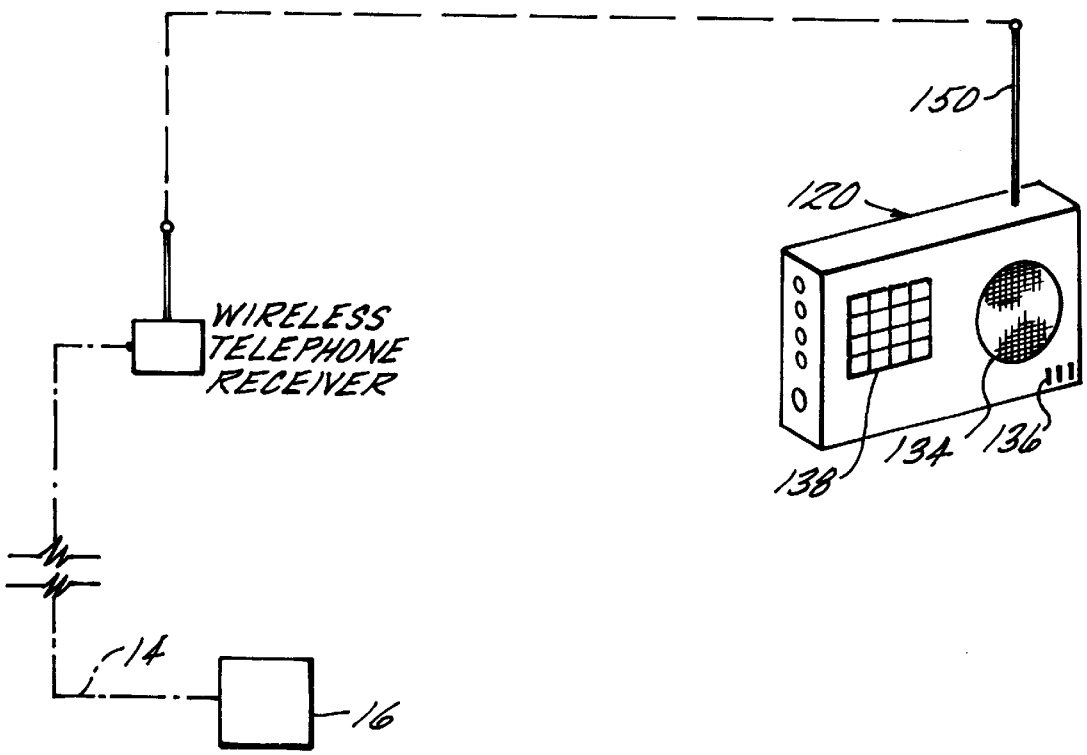
FIG. 10 is a diagrammatic perspective view of the apparatus for remote recording in accordance with a seventh embodiment of the present invention.

Referring to FIG. 10, in accordance another alternate embodiment of the embodiment of FIG. 8, a communication device 148 includes an antenna 150 as is known in wireless telephones. Communication device 148 is the same as communication device 120 except for the addition of the wireless telephone capability.

Figure 11:
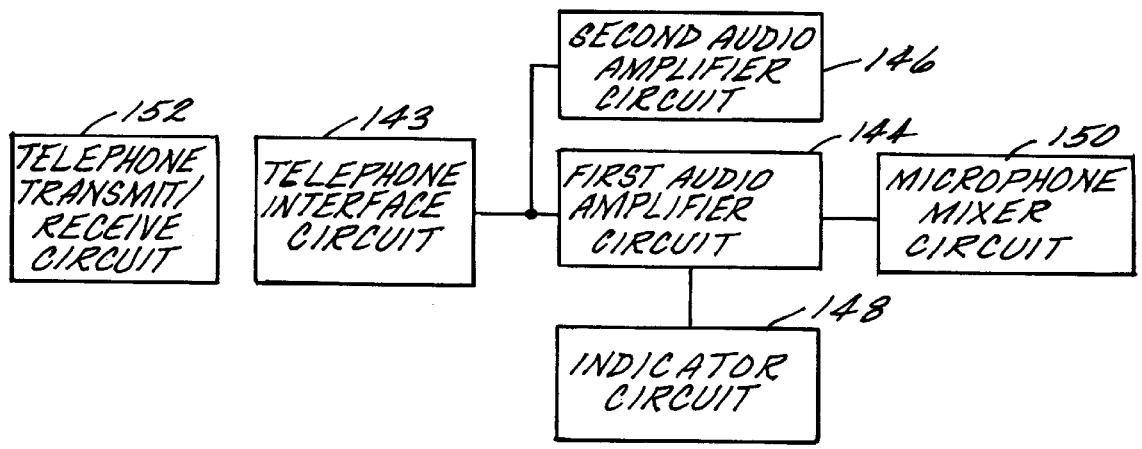
FIG. 11 is a schematic block diagram of the electronics of the apparatus for remote recording of FIG. 10.

Referring to FIG. 11, an electrical block schematic for the electronics of communication device 148 is generally shown. The electronics comprises a standard telephone transmit/receive circuit 152, standard telephone interface circuit 143 (which includes an encoder circuit for interfacing with keypad 138), first audio amplifier circuit 144, second audio amplifier circuit 146, indicator circuit 148, and microphone mixer circuit 150 (when more than one microphone is employed). Operationally, the unit is the same as described above with regard to the embodiment of FIGS. 8 and 9.

The embodiments of FIGS. 5–11 are referred to as full duplex systems as the local portion of the overall system (i.e., the portion capturing the communication being recorded) provides two-way communication.

Figure 12:
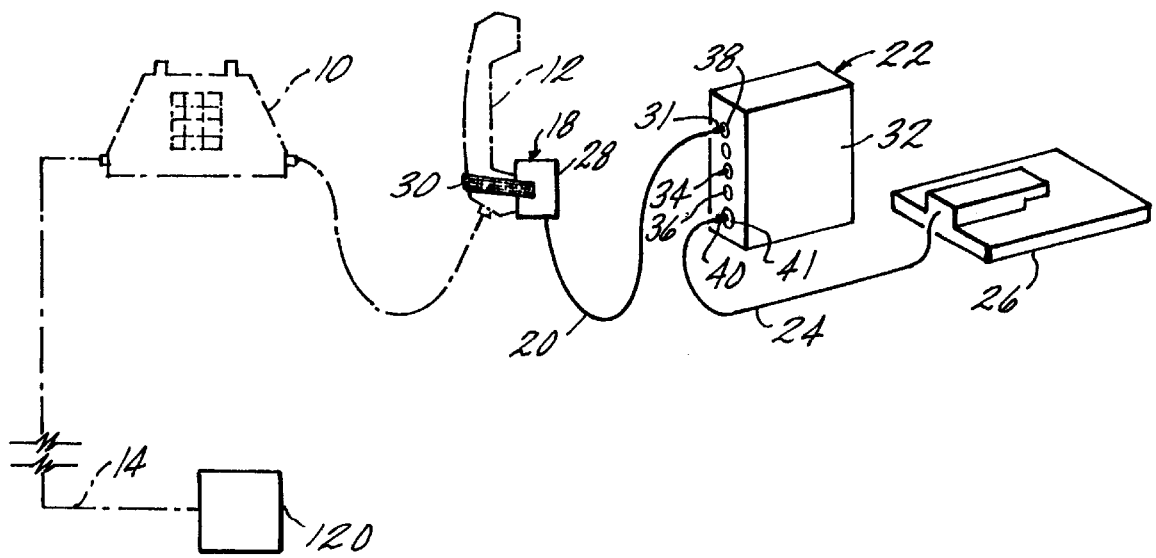
FIG. 12 is a block diagram of an apparatus for remote recording in an exemplary embodiment of the invention.

FIG. 12 is a block diagram of an alternative embodiment of the present invention. In FIG. 12, the recording device 16, shown in FIG. 1 is replaced with a server 120. Of course, the server 120 can be used with any of the other previous embodiments. Server 120 receives calls from clients who want to listen to a previously recorded job, complete recording an unfinished job, or record a new job. Transcriptionists also call the server 120 to complete transcription of an unfinished job or begin transcription of a new job. The server 120 provides a variety of features not available in conventional dictation/transcription systems. A detailed discussion of the operation of the server 120 is provided below with reference to FIGS. 14A–14G.

Figure 13:
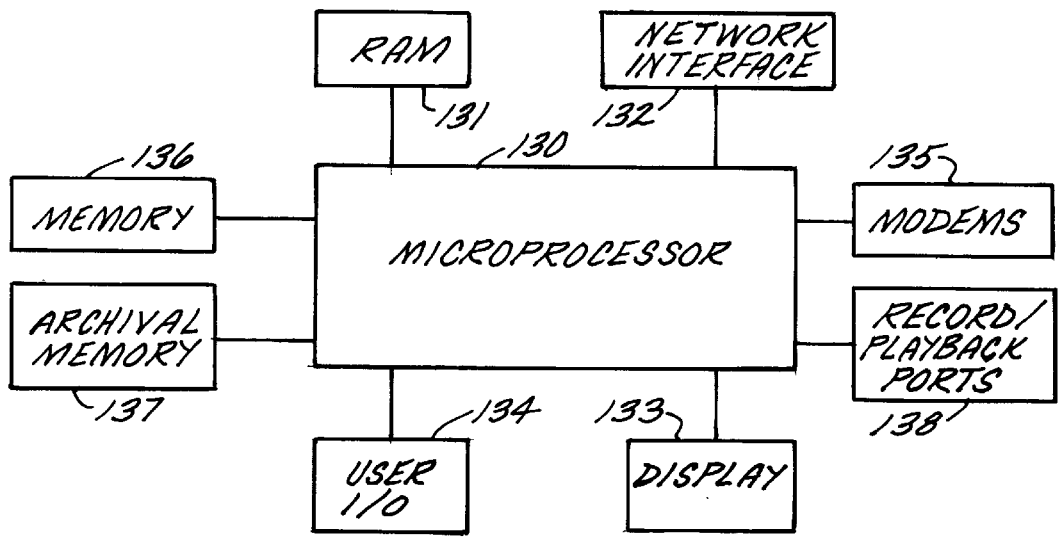
FIG. 13 is a block diagram of components of the server shown in FIG. 12.

FIG. 13 is a block diagram of the major components of the server 120 shown in FIG. 12. A microprocessor 130 executes the server program which is stored in random access memory (RAM) 131. A suitable microprocessor is the Pentium 100 MHz processor available from Intel Incorporated. A network interface card 132 allows the server to communicate to remote terminals over a local area network if desired. The user interacts with the server through input/output (I/O) devices 134, such as a keyboard or a mouse and a display 133. Playback/Record ports 138 receive calls from clients and transcriptionists to provide access to the server. Modems 135 allow for transfer of text files from a transcriptionist to the server and from the server to a client. A transcriptionist may also download voice files if the transcriptionist has a personal computer with a sound card. This reduces phone bills and frees up additional record/playback ports 138. Memory 136 is a memory device such as a magnetic disk, for short term storage of voice files. In an exemplary embodiment, the memory 136 stores 48 hours of speech. Archival memory 137 stores text and optionally stores voice files for long term storage. The archival storage 137 may be 4.6 gigabyte magneto-optical drives with removable cartridges. The cartridges are numbered an noted in a centralized database. Future retrieval of voices for playback or text files for reproduction of documents is completely automated.

FIGS. 14A–14G are flow diagrams illustrating the operation of the server 120 shown in FIG. 12 when receiving a call from a user or a transcriptionist. The process begins at step 200 and proceeds to step 202 where the caller is prompted to enter their user identification number. The identity of the user associated with the user identification number is audibly output to the caller and the caller confirms that they have entered the correct user identification number. Creation of the audible user identification is described below with reference to FIG. 15.

Figure 14A:
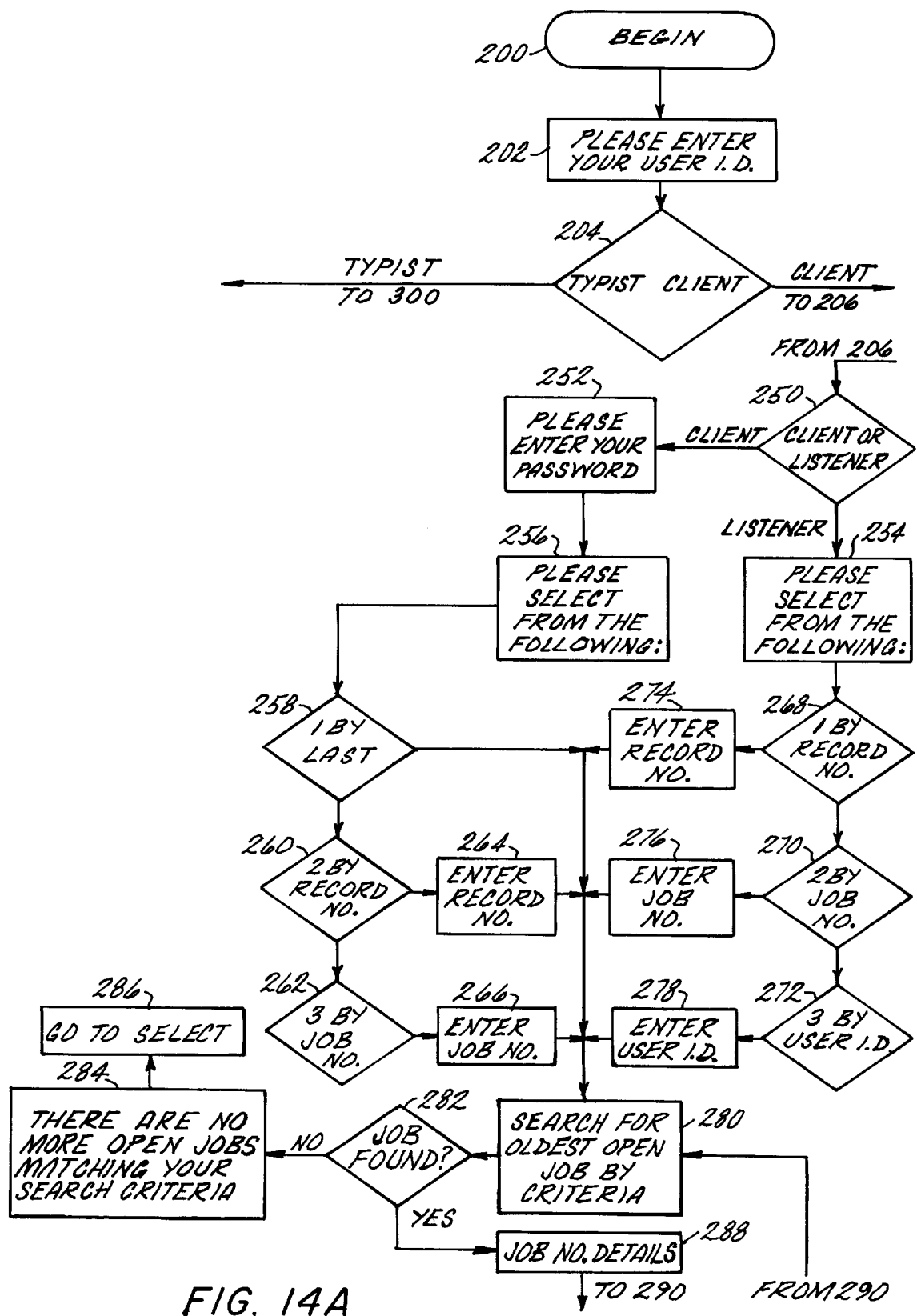
FIG. 14A–14G are flow diagrams of a process performed by the server.
Figure 14B:
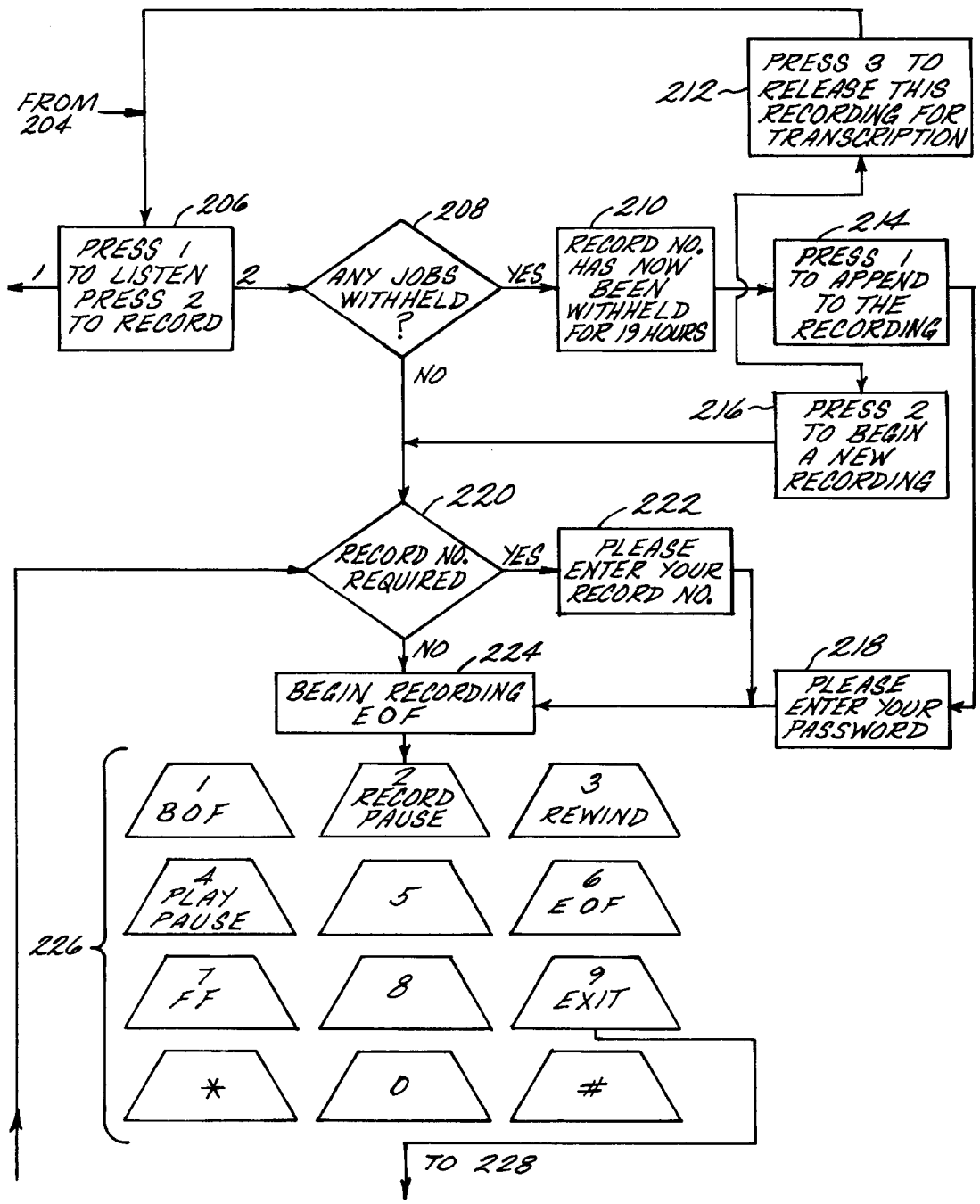

If the caller is a client, the process goes to step 206 in FIG. 14B where the client is given the option to record new communication or listen to already recorded communication. If the client selects "2" at step 206, step 208 determines whether any jobs have been withheld and notifies the client at step 210 of the existence of any withheld jobs. In an exemplary embodiment, clients may only withhold one job to reduce the amount of stored incomplete jobs. The server 120 provides the client with the ability to withhold an unfinished job from transcription so that the client can call back at a later time and complete recording the communication. If any jobs have been withheld, steps 212, 214, and 216 allow the client to release the job for transcription, append to the withheld recording or begin a new recording, respectively. If the user selects to append to the withheld recording, a user password is entered at step 218 and recording begins at step 224.

If no jobs have been withheld, or if the client selects to begin a new recording, the process flows to step 220 where the system determines whether a record number is required for this client. As described below with reference to FIG. 15, a client may request to have a record number assigned to each job. For example, a court may desire to have the court's docket number assigned to any jobs. If a record number is required, the client enters the record number at step 222 and recording begins at step 224. The request for the record number may be generic such as "please enter the record number" or may be client specific such as "please enter the insurance claim number" depending upon how the user profile is created. This feature is discussed in detail below with reference to FIG. 15. Keypad 226 allows the client to control the recording. Button "1" labeled BOF is a function that proceeds to the beginning of the recording and begins playing. Button "6" labeled EOF is a function that proceeds to the end of the recording, rewinds five seconds, and begins playing. These functions allow the user to quickly and easily locate the beginning and end of a recording. If the user profile for the client has enabled the file integrity option, described in detail below with reference to FIG. 15, the majority of the functions of keypad 226 are disabled. If the user presses the "9" key on the keypad 226, the recording ends and the process proceeds to step 228 in FIG. 14C.

At step 228, the dictation is assigned an internal job number and this job number is provided to the client. The job number is used by the server 120 for tracking the job and updating the status of each job as described below with reference to FIG. 16. At step 230 the system determines whether any jobs are withheld. If so, the user is not given the option to withhold this job, but is given the option to begin recording a new job at step 232. The user is also given the opportunity to request priority processing at step 240. If no jobs are withheld, the user may select to make a new recording at step 234, withhold the current job for 24 hours at step 236, or request priority processing at step 240. If the client has not selected any of these options, the process flows to step 244 where the user is given the option to exit the system. Steps 246 and 248 provide exit messages to the client prior to disconnecting from the system which allow the client to return to the main menu if desired.

At step 206 in FIG. 14B, the client may request to listen instead of record. Flow proceeds to step 250 in FIG. 14A where the user is identified as either a client or a listener. Listeners are granted access to listen to recordings under an account number. For example, two doctors in a laboratory may be granted listening access under a single account number. This provides co-workers with the ability to review each other's recordings. If the caller is a listener, the process proceeds to steps 254 and 268–278. These steps allow the listener to select a search criterion for locating a job based on record number, job number, or user ID and are self explanatory. If at step 250, the caller is a client, the client is prompted to enter a password at step 252. The process flows to steps 256–266 which allow the client to select a search criterion for locating a job based on record number, job number, or user ID and are self explanatory. Once the caller has selected a search criterion, step 280 locates the oldest open job matching the selected criterion. If no job is found at step 282, the process notifies the user at step 284 and proceeds back to the appropriate selection steps 256 or 254 through step 286.

Figure 14C:
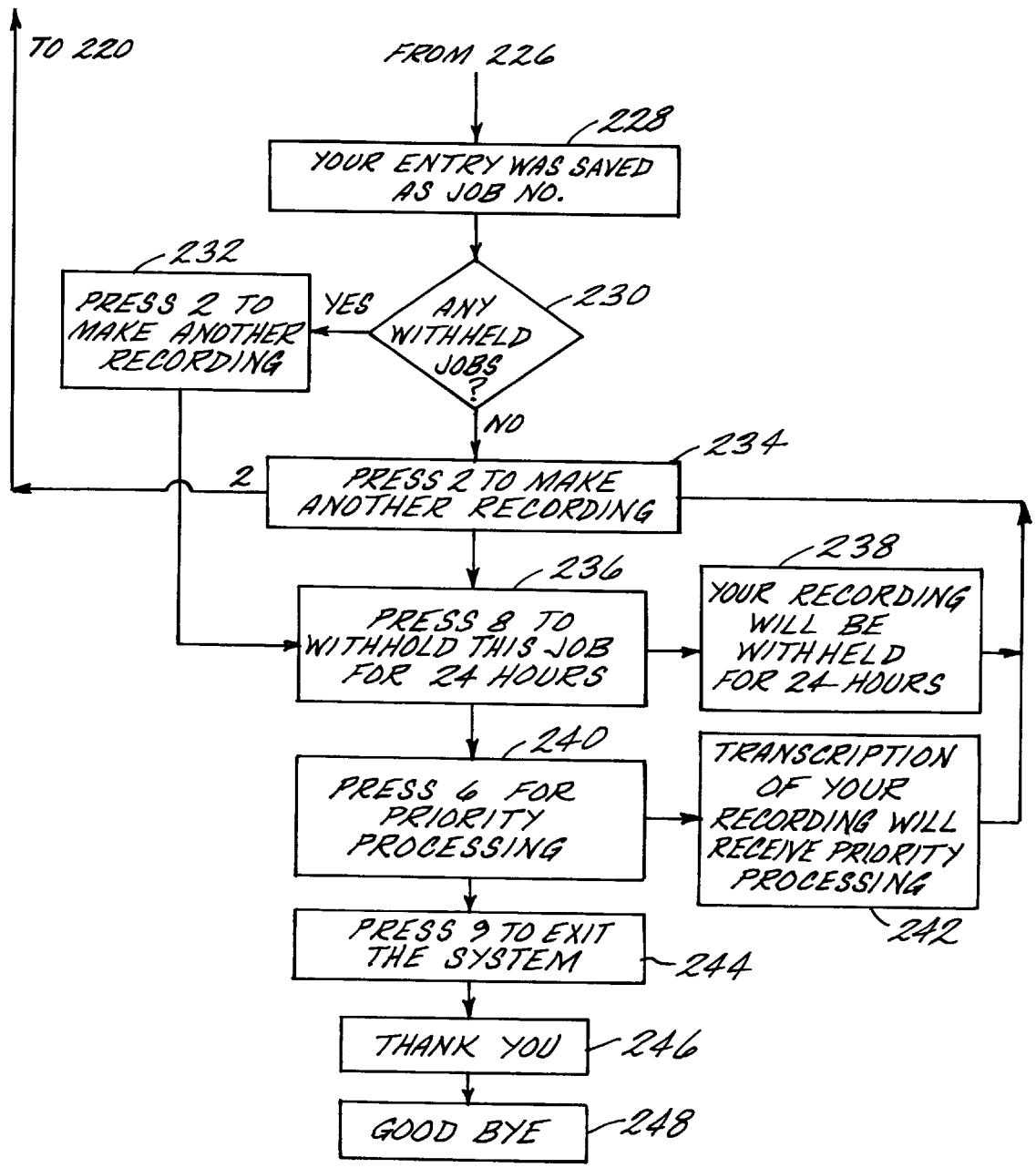
Figure 14D:
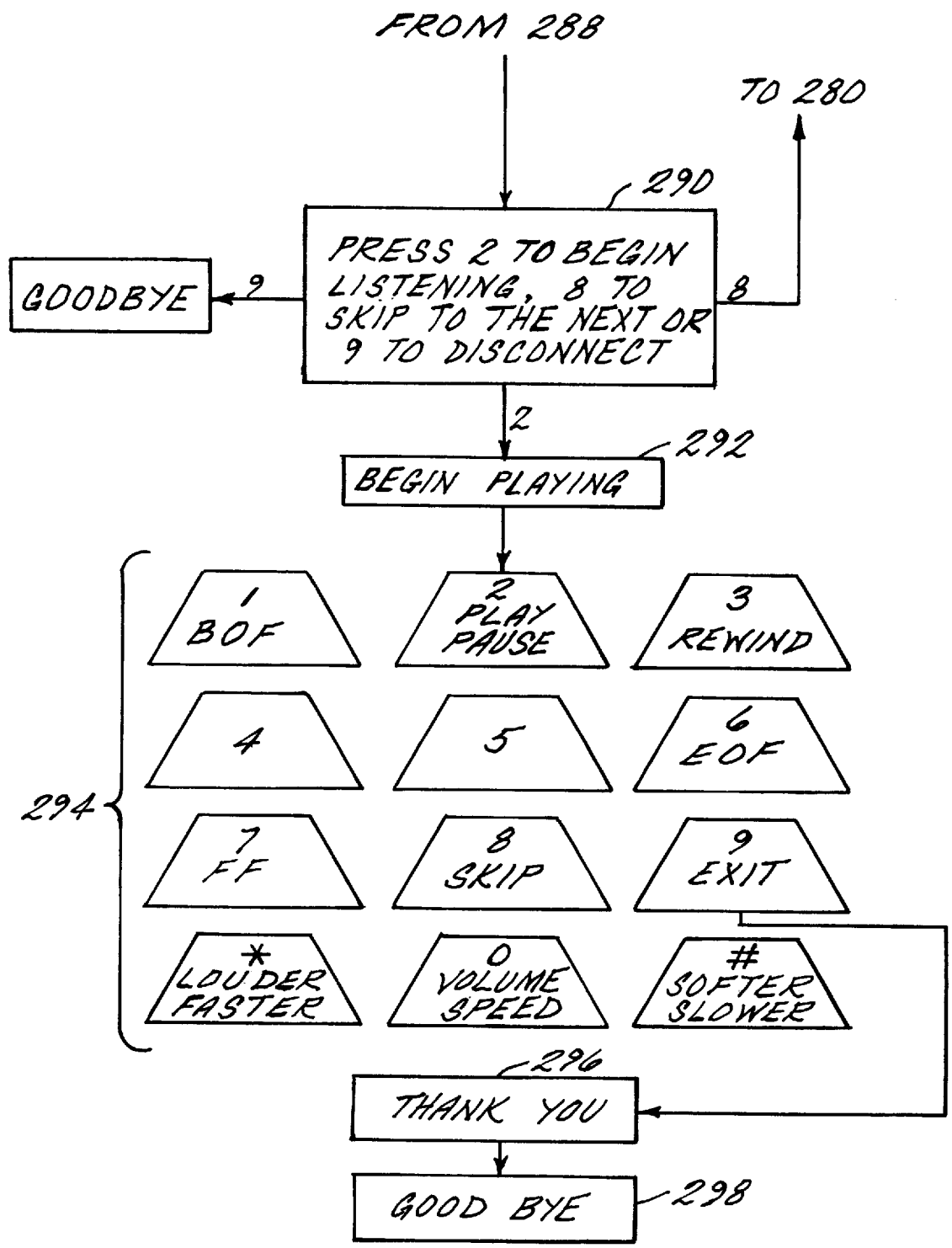

Once a job is found, the job details are provided to the caller at step 288 and flow proceeds to step 290 in FIG. 14D. At step 290, the user may disconnect by pressing 9, skip to the next job matching the search criterion by pressing 8, or listen to the job by pressing 2. Step 292 begins the playback process and the user can control the playback through keypad 294. Because the user is within the listen portion of the routine, the record feature is omitted from keypad 294. If the user presses the exit button "9", the listen routine is ended. Steps 296 and 298 provide exit messages to the user prior to disconnecting from the system which allow the user to return to the main menu if desired.

Figure 14E:
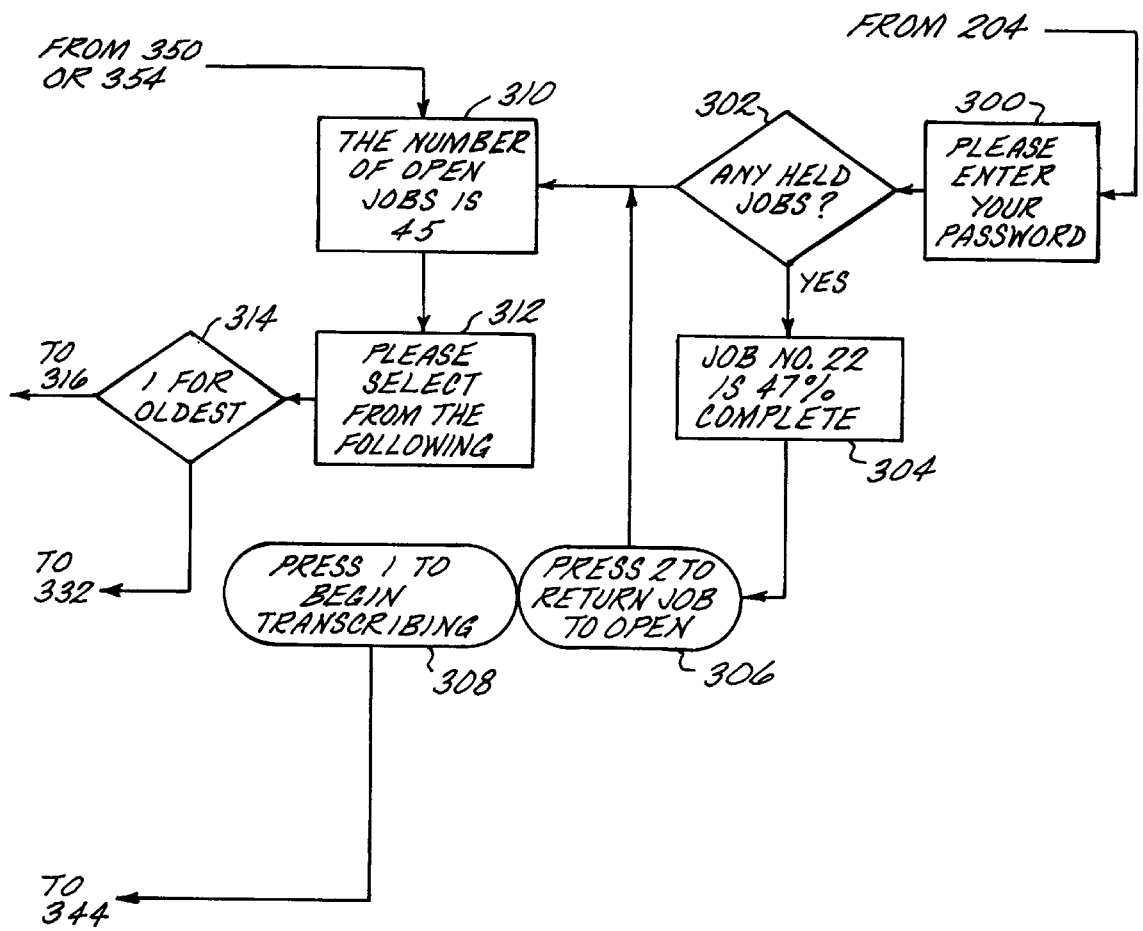
Figure 14F:
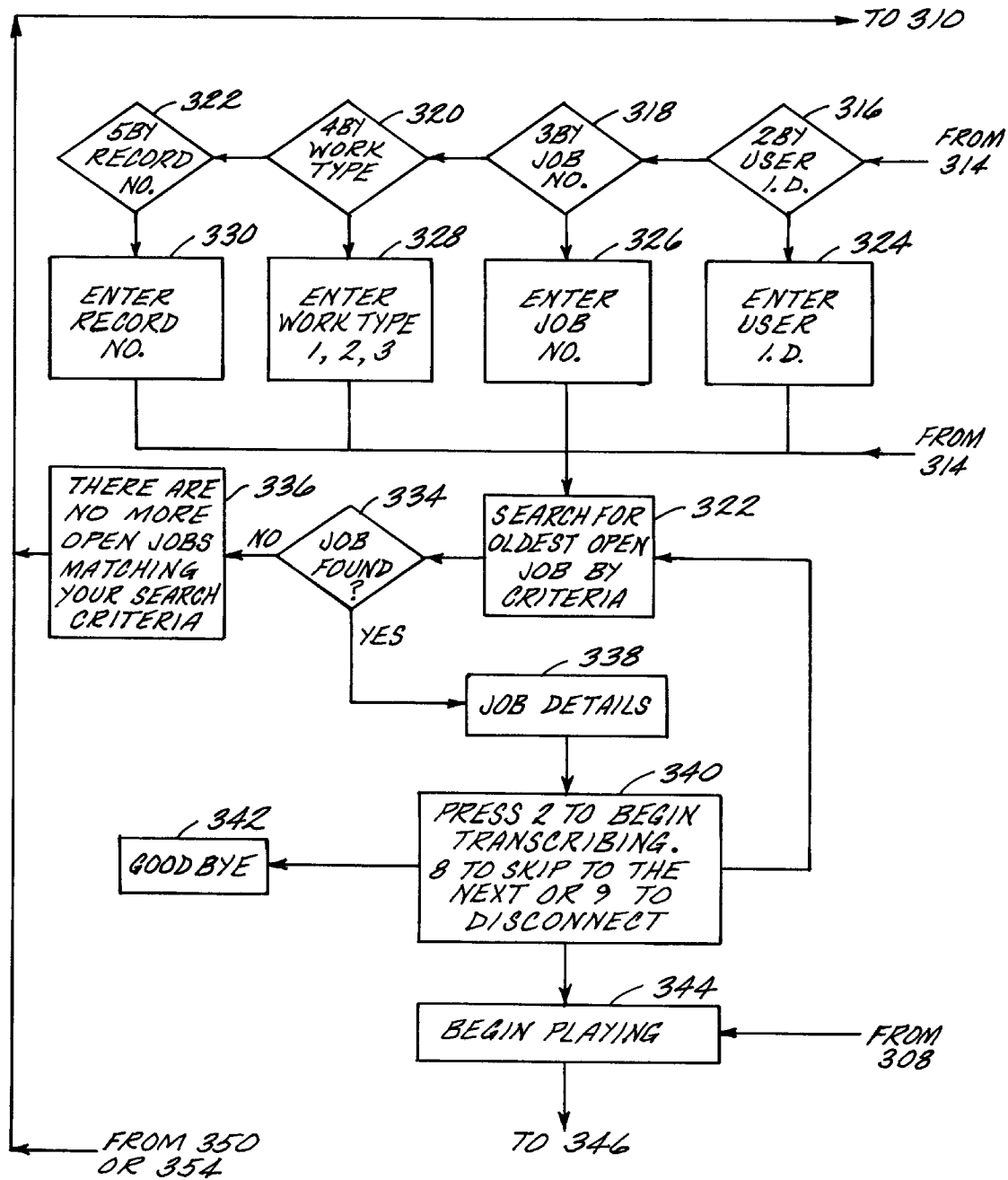
Figure 14G:
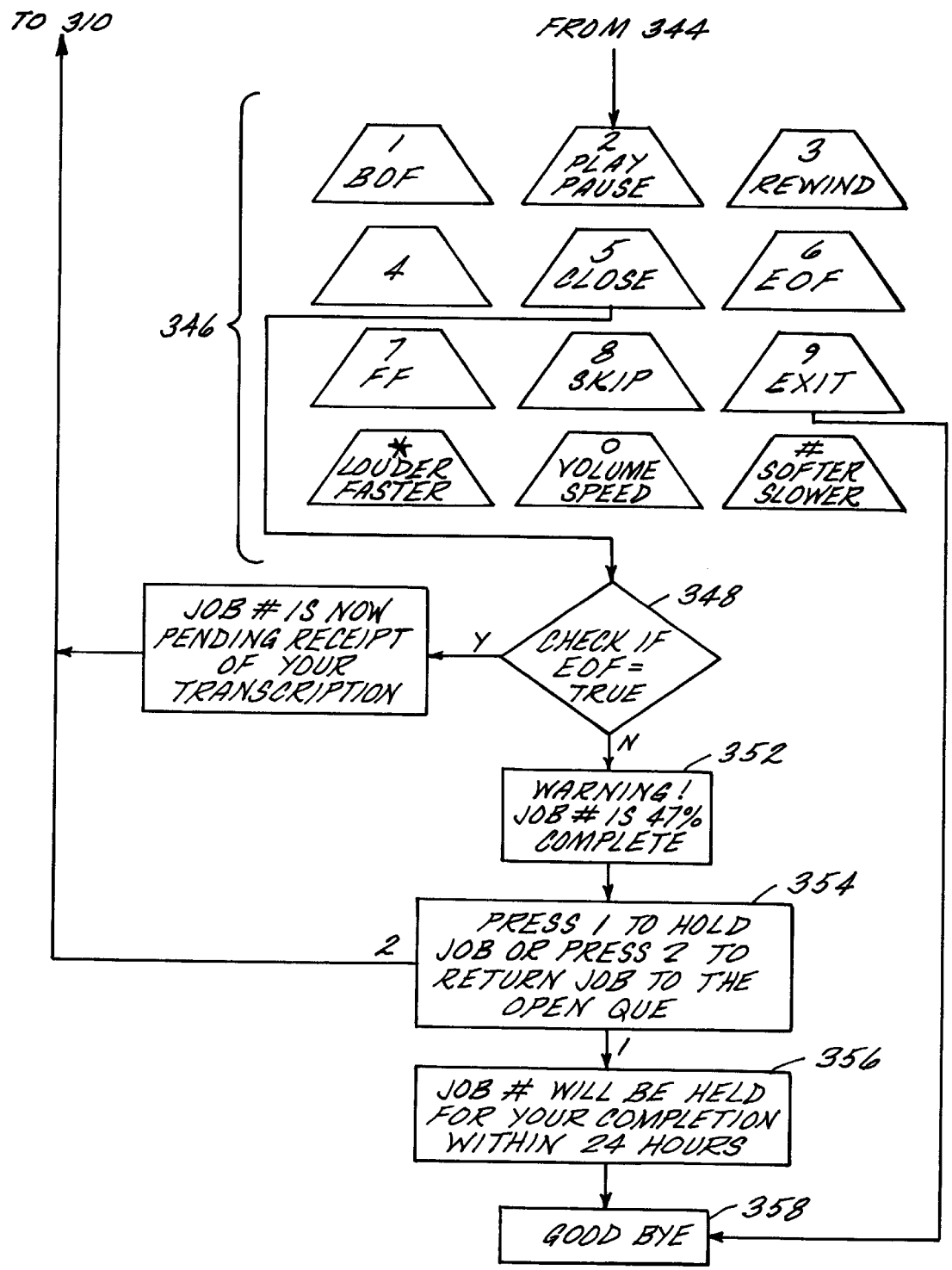

In FIG. 14A, step 204, if the caller is identified as a typist, flow proceeds to step 300 in FIG. 14E where the typist is prompted to enter a password. The typist is notified of any held jobs at step 302. As discussed below, the typist may hold a job for later completion. If a job has been held, the details of the job are provided at step 304 and the typist may complete the held job or return the job to the que of open jobs through steps 306 and 308. Only one job may be held at a time. If the typist selects "1" at step 308, the held job is played as discussed below. If the typist selects "2" at step 306, the held job is returned to open status and the process flows to step 310 where the number of open jobs is announced. The typist selects a search criterion for selecting a job through steps 312 to 330 (shown in FIG. 14F). A search is performed at step 332 and if no matching job is found at step 334, the typist is notified at step 336 and the process returns to step 310.

Once a job is found in step 334, the job details are announced at step 338 and the typist is given the opportunity to begin transcribing, skip to the next job or disconnect from the system at step 340. If disconnect is selected, step 342 provides exit messages to the typists, including an option to return to the main menu. At step 344, the system begins playing the selected job. The selected job may be a held job that was selected by the typist at steps 306 and 308 of FIG. 14E. Control of the playback is performed through keypad 346 shown in FIG. 14G. It is understood that a variety of devices may be used to control the playback including transcriptionist devices that include foot switches for controlling the playback and headsets for listening to the playback.

If the typist presses the "9" button on keypad 346, the process goes to step 358 where exit messages are provide to the typist prior to exiting the system. If the typist presses the "5" button to close the current job, the system determines whether the end of file (EOF) for the job has been reached at step 348. If the EOF has ben reached, the typist has heard the entire audio file, and is prompted at step 350 that the transcription is ready to be uploaded to the server 120. If step 348 determines that the EOF has not been reached, the typist is notified that the job is incomplete and is given the option to hold the job or return the job to the open job que and proceed to step 310 shown in FIG. 14 E. If the typist requests to hold the job, confirmation of holding the job is provided at step 356 and the typist exits at step 358. Exit messages, including an option to return to the main menu, are provided at step 358.

Figures 15, 16:
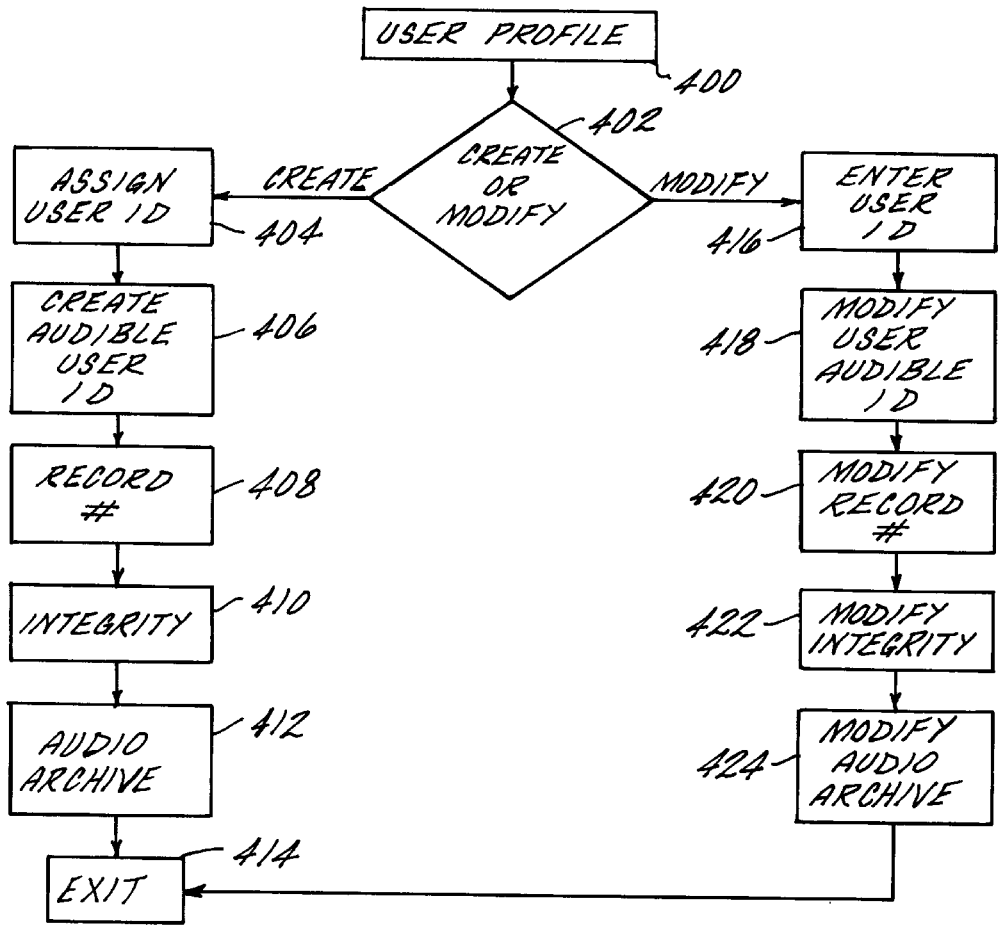
FIG. 15 is a flow diagram of another process performed by the server.
FIG. 16 is an illustration of tracking data stored by the server.

FIG. 15 is a flow diagram of the process for creating or modifying a user configurable profile. The server 120 is unique in that it allows the user to define their own user profile. The process begins at step 400 and proceeds to decision block 402 where the user is prompted to identify whether they are a new user or an existing user. If the user is a new user, the process proceeds to step 404 where the user is assigned a unique user identification number. In step 406, the user is prompted to speak their user name, and the spoken name is played back to the user for confirmation. As discussed above with respect to FIG. 14A, this audible user identification is used in step 202 to identify the user associated with an identification number.

At step 408 the user is asked whether a record number is to be associated with each job. For example, an insurance company may need an internal claim number to be associated with each job. At step 408, the user designates whether a record number is to be associated with each job. The user's designation at step 408 affects the flow at step 220 shown in FIG. 14B. At step 408 the user may select a generic record number or a user defined record number. Selecting a generic record number will cause step 222 of FIG. 14B to recite "please enter the record number" or a similar generic prompt. If at step 408, the user requests a specific record number, the user is prompted to clearly speak the record number designator. For example, an insurance representative may state "claim number." In this example, step 222 of FIG. 14B would prompt the user to "please enter the claim number." This feature allows a novice user to easily enter the appropriate record number.

At step 410, the user is questioned whether file integrity is desired. The file integrity option disables the majority of the functions of keypad 226 shown in FIG. 14B. If file integrity is selected, the user can only record and exit. This feature is useful in the law enforcement field where a dialog between a law enforcement officer and a declarant must be accurately stored. By disabling the pause, rewind, and fast forward functions, it is guaranteed that the communication downloaded to the server 120 is complete and that portions of the communication have not been erased or recorded over.

At step 412, the user is questioned whether audio files are to be stored in archival storage. In normal operation, audio files are stored until the transcriptionist has forwarded the transcribed audio file to the server 120. At this time, the audio files are purged from storage. If the user selects the audio archive option at step 412, audio files are stored in archival storage upon receipt. The process flows to step 414 where the user configuration routine is exited.

If at step 402, the user requests to modify an existing user profile, the process proceeds to step 416 where the user identification number is entered. The audible user identification that the user has stored is played back to the user for confirmation that the correct user identification number has been entered. In step 418, the current user audible identification is played to the user and the user is asked if a change is desired. If so, the user records a new audible user identification. Steps 420–424 proceed in a similar fashion where the user is informed of the current field status and provided an opportunity to modify the status if desired. Once the user has been given an opportunity to modify all the fields in the user profile, the process is exited at step 414.

FIG. 16 is an illustration of a portion of a tracking screen from a tracking application executed by the server 120. The tracking application allows the operator of the server 120 to know the status of every job from when the client begins recording to when the text is finally delivered to the client. This allows the operator of the server to monitor job progress and promptly and accurately respond to client queries regarding job status. The tracking information includes job number which is the job number assigned to the server, job status, user identification number, vox file which identifies where the voice file is stored, vox size which indicates the size of the voice file, the typist (if any) who has accessed the job, the text file name where the transcribed text is store, the size of the text file, and the date the text file was delivered to the client. It is understood that additional information may be included in the tracking application data and that the specific items described above are illustrative.

As jobs are received from a client, the server 120 assigns each job a job number as shown in step 228 of FIG. 14C. The status of each job is then automatically updated by the server 120 as follows. Each job is assigned the status RECORD while it is being provided by the client. Once the client has completed the recording, the status is updated to OPEN which designates that the job is now open for transcription. If the job is accessed by a transcriptionist, the status of the job is changed to TSCRIBE. Once the transcriptionist has listened to the entire job, the status becomes PENDING which indicates that the server is now awaiting receipt of the text from the transcriptionist. Upon receipt of the text from the transcriptionist, the status is updated to RECEIVED. The text for the job is then forwarded to the client and the status is changed to DELIVERED. Once delivery of the text of the job is complete, the text file is stored in archival storage as discussed above and the status is changed to ARCHIVED.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for recording, at a first location, a communication at a second location, the first location being remote from the second location and interconnected by a communication medium, the method comprising:

creating a user configurable profile which defines user identification data and recording options for a user;

storing the user configurable profile;

recording the communication, said recording step being responsive to the recording options in the stored user configurable profile;

providing the recorded communication to a transcriptionist for transcription; and receiving a transcribed communication from the transcriptionist;

wherein the user identification data includes a user identification number assigned to a user and an audible user identification which is associated with each user identification number and assigned to said user the audible user identification providing an audible confirmation of an entered user identification number.

2. The method of claim 1, further comprising: prompting a user to enter the user identification number prior to recording; and audibly outputting the audible user identification corresponding to the entered user identification number.

3. A method for recording, at a first location, a communication at a second location, the first location being remote from the second location and interconnected by a communication medium, the method comprising:

creating a user configurable profile which defines user identification data and recording options for a user;

storing the user configurable profile; and recording the communication, said recording step being responsive to the recording options in the stored user configurable profile wherein the user controls the recording through recording functions at the second location and the recording options includes an integrity option for disabling at least one of the recording functions while continuing to record the communications without utilizing the disabled recording function.

4. The method of claim 1, wherein the recording options include an audio archive option for enabling archival storage of the recording.

5. The method of claim 1, wherein the recording step comprises withholding an unfinished job for subsequent completion.

6. The method of claim 5, further comprising notifying the user that a job has been withheld and resuming recording of the withheld job.

7. The method of claim 5, further comprising notifying the user that a job has been withheld and releasing the withheld job for transcription.

8. The method of claim 3 wherein said disabled recording function is pause.

9. The method of claim 3 wherein said disabled recording function is rewind.

10. The method of claim 3 wherein said disabled recording function is fast forward.

11. A method for recording, at a first location, a communication at a second location, the first location being remote from the second location and interconnected by a communication medium, the method comprising:

receiving the communication from a client and storing the communication as an audio file in a storage medium;

automatically forwarding the audio file to a transcriptionist for transcription;

automatically receiving a transcription from the transcriptionist and saving the transcription as a text file; and automatically purging the audio file corresponding to the transcription from the storage medium after saving the transcription as a text file.

\* \* \* \* \*